(12) United States Patent
Tamura et al.

(10) Patent No.: US 9,817,184 B2
(45) Date of Patent: Nov. 14, 2017

(54) OPTICAL FIBER

(71) Applicant: SUMITOMO ELECTRIC INDUSTRIES, LTD., Osaka-shi, Osaka (JP)

(72) Inventors: Yoshiaki Tamura, Yokohama (JP); Tetsuya Haruna, Yokohama (JP); Masaaki Hirano, Yokohama (JP); Hirotaka Sakuma, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/290,105

(22) Filed: Oct. 11, 2016

(65) Prior Publication Data

US 2017/0108642 A1  Apr. 20, 2017

(30) Foreign Application Priority Data

Oct. 15, 2015  (JP) ................................ 2015-203490

(51) Int. Cl.
  *G02B 6/02* (2006.01)
  *G02B 6/036* (2006.01)
  *C03C 13/04* (2006.01)

(52) U.S. Cl.
  CPC ........ *G02B 6/03694* (2013.01); *C03C 13/045* (2013.01); *C03C 13/046* (2013.01); *G02B 6/03611* (2013.01); *C03C 2201/11* (2013.01); *C03C 2201/12* (2013.01); *C03C 2201/50* (2013.01); *C03C 2201/54* (2013.01); *C03C 2213/00* (2013.01)

(58) Field of Classification Search
  CPC ............ G02B 6/03694; G02B 6/03611; C03C 13/046; C03C 2213/00

USPC .......................................................... 385/127
See application file for complete search history.

(56) References Cited

U.S. PATENT DOCUMENTS

| 6,446,469 B2 * | 9/2002 | Terasawa .......... C03B 37/01211 65/398 |
| 9,335,465 B2 | 5/2016 | Hirano et al. |
| 2008/0050086 A1 * | 2/2008 | Bickham .......... C03B 37/01807 385/142 |

FOREIGN PATENT DOCUMENTS

| EP | 1 336 878 A2 | 8/2003 |
| EP | 2 692 705 A1 | 2/2014 |
| EP | 2 894 498 A1 | 7/2015 |
| JP | 2005-202440 A | 7/2005 |

(Continued)

OTHER PUBLICATIONS

M. E. Lines, "Scattering losses in optic fiber materials. I. A new parametrization," Journal of Applied Physics, 1984, pp. 4052-4057, vol. 55.

*Primary Examiner* — Jerry Blevins
(74) *Attorney, Agent, or Firm* — Drinker Biddle & Reath LLP

(57) ABSTRACT

An optical fiber having a reduced attenuation includes a silica glass core and a silica glass cladding. The silica glass core has substantially no germanium and includes a first core and a second core. The second core encloses the first core, the refractive index of the second core is larger than the refractive index of the first core, and the average value of halogen concentration of the second core is 5000 ppm or more. The silica glass cladding surrounds the second core and contains substantially no germanium. The refractive index of the cladding is smaller than the refractive index of the first core.

10 Claims, 5 Drawing Sheets

(56) References Cited

FOREIGN PATENT DOCUMENTS

JP         2013-061620 A    4/2013
WO    WO 2014/178361 A1  11/2014

\* cited by examiner

FIG. 6

| Examples | Average value at core region Potassium concentration (Preform) | First core | | Second core | | Attenuation at 1550nm |
|---|---|---|---|---|---|---|
| | | Fluorine concentration | Chlorine concentration | Fluorine concentration | Chlorine concentration | |
| 1 | 0 | 2000 | 0 | 0 | 100 | 0.16 |
| 2 | 5 | 9000 | 200 | 6000 | 2000 | 0.153 |
| 3 | 12 | 8000 | 150 | 8000 | 10000 | 0.148 |
| 4 | 50 | 8000 | 90 | 2000 | 8000 | 0.150 |
| 5 | 70 | 8000 | 100 | 8000 | 9000 | Crystalized |

OPTICAL FIBER

FIELD OF THE INVENTION

The present invention relates to an optical fiber.

BACKGROUND ART

The attenuation of an optical fiber includes Rayleigh scattering loss, structural imperfection loss, OH absorption loss, and infrared absorption loss. Of these, the Rayleigh scattering loss occupies about 80% of the attenuation at the wavelength of 1550 nm, including those resulting from density fluctuation and those resulting from concentration fluctuation (See M. E. Lines, J. Appl. Phys. 55, 4052 (1984)).

An optical fiber having a pure silica core which includes substantially no metal dopants such as $GeO_2$ for increasing refractive index is designed to have an optical waveguide structure in which the refractive index of the cladding is made smaller than that of the core by adding fluorine to the cladding. In such optical fiber having a pure silica core, the scattering loss due to concentration fluctuation is reduced since the core contains chlorine (Cl) only and substantially no other dopants than chlorine (See Japanese patent laid-open No. 2005-202440). On the other hand, it is known that the splicing loss can be reduced if the core have a refractive-index profile of ring form (See Japanese patent laid-open No. 2013-61620). In order to attain the ring-form profile, it is necessary to dope the core with dopants for changing refractive index, such as germanium and fluorine.

SUMMARY OF THE INVENTION

Object of the Invention

The object of the present invention is to provide an optical fiber in which the attenuation is reduced.

Means for Achieving the Object

An optical fiber of the present invention comprises: (1) a silica glass core having substantially no germanium and including a first core and a second core, the second core enclosing the first core, the refractive index of the second core being larger than the refractive index of the first core, and the average value of halogen concentration of the second core being 5000 ppm or more; and (2) a silica glass cladding surrounding the second core and containing substantially no germanium, the refractive index of the cladding being smaller than the refractive index of the first core.

In the optical fiber of the present invention, the relative refractive index difference of the second core may be −0.05% or more and +0.05% or less on the basis of the refractive index of pure silica glass. The fluorine concentration of the second core may be 500 ppm or more and 10000 ppm or less. The chlorine concentration of the second core may be 4500 ppm or more and 15000 ppm or less. Moreover, in the second core, the chlorine concentration may be higher than the fluorine concentration.

In the optical fiber of the present invention, the fluorine concentration of the first core may be 5000 ppm or more and 15000 ppm or less. The chlorine concentration of the first core may be 10 ppm or more and 1000 ppm or less. The relative refractive index difference between the first core and the second core may be preferably 0.05% or more and 0.15% or less. Let H2 be the halogen concentration of the second core and H2 be the halogen concentration of the first core, the ratio H2/H1 may be preferably 1 or more and 2 or less. Moreover, the above-mentioned core may contain both alkali metal and alkaline earth metal or either one of them.

The term "silica-based glass" as used in this specification means glass that contains $SiO_2$ as a main component. The term "atomic ppm" means the number of dopant atom in one million units of $SiO_2$.

Effect of the Invention

According to the present invention, an optical fiber in which the attenuation is reduced can be provided.

BRIEF DESCRIPTION OF DRAWINGS

FIG. 6 is a table summarizing the average potassium concentration of the core region of an optical fiber preform, the average fluorine concentration and average chlorine concentration of the first core, the average fluorine concentration and average chlorine concentration of the second core, and the attenuation at the wavelength of 1550 nm with respect to the optical fiber of FIG. 1.

DETAILED DESCRIPTION OF THE INVENTION

Hereafter, preferred embodiments of the present invention will be described in detail with reference to accompanying drawings. The invention is not limited to these embodiments, and it is intended that the invention be shown by the scope of claims, including an equivalent to a claim and all modifications within the scope of invention.

Figure 1:
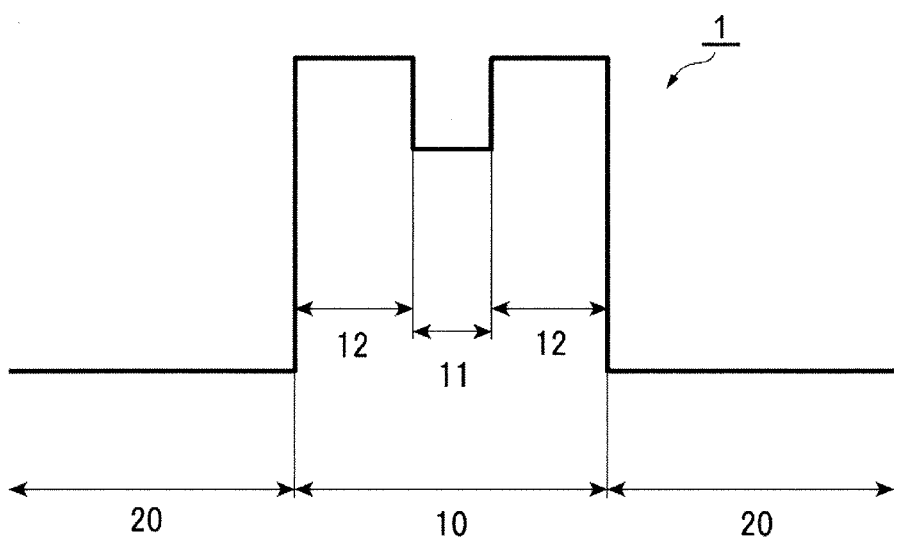
FIG. 1 is a schematic diagram showing the refractive index profile of an optical fiber according to an embodiment of the present invention.

FIG. 1 is a schematic diagram showing the refractive index profile of an optical fiber 1 according to an embodiment of the present invention. The optical fiber 1 has a core 10 made of silica-based glass and a cladding 20 enclosing the core 10 and made of silica-based glass. The core 10 consists of a first core 11 and a second core 12 enclosing the first core 11. The refractive index of the second core 12 is larger than the refractive index of the first core 11. The refractive index of the cladding 20 is smaller than the refractive index of the first core 11. The core 10 and the cladding 20 contain substantially no germanium.

The core 10 contains fluorine and chlorine. The cladding 20 contains fluorine. By doping glass with fluorine, the viscosity of the glass can be decreased and the refractive index of the glass can be lessened. Also, by doping glass with chlorine, the viscosity of the glass can be decreased and the refractive index of the glass can be increased. The optical fiber 1 can be produced by drawing an optical fiber preform having the same refractive index profile as that of the optical fiber of FIG. 1.

Figure 2:
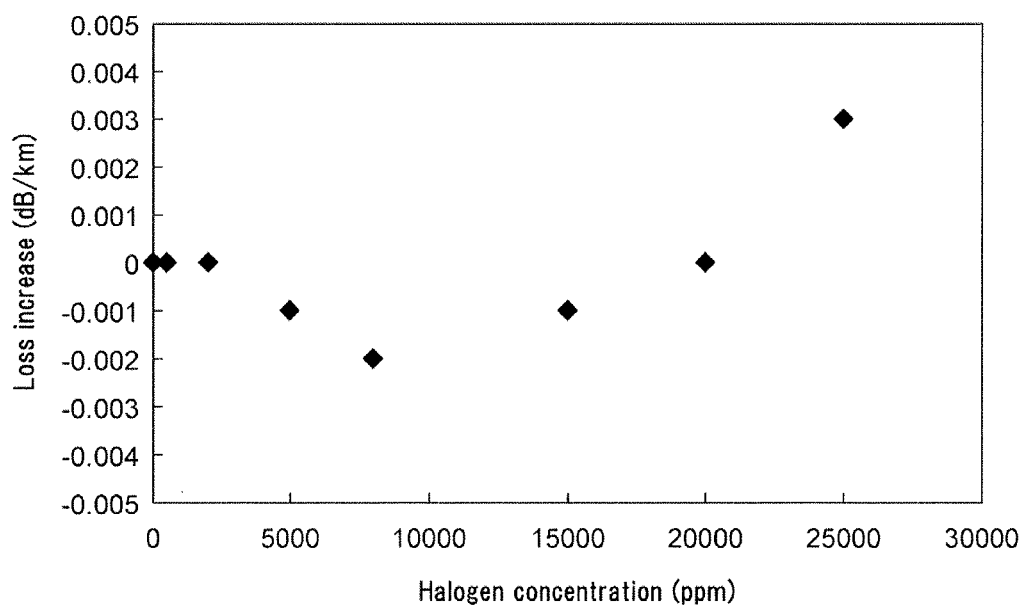
FIG. 2 is a graph showing the relationship between the average halogen concentration of the second core and the amount of increase/decrease of its attenuation at the wavelength of 1550 nm with respect to the optical fiber of FIG. 1.

FIG. 2 shows a graph showing the relationship between the average halogen concentration of the second core 12 and the amount of increase/decrease of the attenuation at the wavelength of 1550 nm. Table 1 is a summary of relationships between the average halogen concentration of the second core 12 and the amount of increase/decrease of the attenuation at the wavelength of 1550 nm. The halogen concentration is the sum of the fluorine concentration and chlorine concentration in the glass. The amount of increase/decrease of the attenuation of an optical fiber is shown on the basis of the attenuation in case where the first core 11 of the optical fiber 1 contains fluorine of 5000 ppm and the second core 12 contains substantially no halogen.

TABLE I

| Concentration of halogen in second core [ppm] | Loss increase at 1550 nm [dB/km] |
| --- | --- |
| 0 | 0.000 |
| 500 | 0.000 |
| 2000 | 0.000 |
| 5000 | −0.001 |
| 8000 | −0.002 |
| 10000 | −0.020 |
| 15000 | −0.001 |
| 20000 | 0.000 |
| 25000 | 0.003 |

As can be seen from FIG. 2 and Table I, the attenuation of the optical fiber 1 at the wavelength of 1550 nm was decreased as compared to the standard when the average halogen concentration of the second core 12 of the optical fiber 1 was 5000 atomic ppm or more and 20000 atomic ppm or less. When the average halogen concentration of the second core 12 of the optical fiber 1 was 20000 atomic ppm or more, the scattering loss due to concentration fluctuation became larger as the halogen concentration became larger, and accordingly the attenuation of the optical fiber 1 increased. Therefore, the optimum range of the average halogen concentration of the second core 12 of the optical fiber 1 is 5000 to 20000 atomic ppm.

It is possible to calculate optical power of each region of the optical fiber 1 by integration according to the following formula (1):

$$\int 2\pi r \, P(r) dr \quad (1),$$

whereas the radial distance from the central axis of the optical fiber 1 is r, and the distribution of the optical power is P(r). As a result of this calculation, the integration value of the optical power of the second core 12 is larger than the integration value of the optical power of the first core 11, and it is assumed that the influence of the glass of the second core 12 significantly affects the attenuation of the optical fiber 1.

Therefore, in order to reduce the scattering loss due to the refractive-index fluctuation of the dopants in the second core 12, the refractive index of the second core 12 is preferably nearer to that of pure silica glass. Actually, when the relative refractive index difference of the second core was −0.05% or more and +0.05% or less as compared with the refractive index of pure silica glass, no attenuation due to refractive-index fluctuation was seen. Moreover, when the absolute value of the relative refractive index difference of the second core 12 was greater than 0.05% as compared to the pure silica glass which contains substantially no halogen, the attenuation of the optical fiber 1 was larger by 0.001 dB/km or more as compared to the optical fiber having a second core made of pure silica glass.

Figure 3:
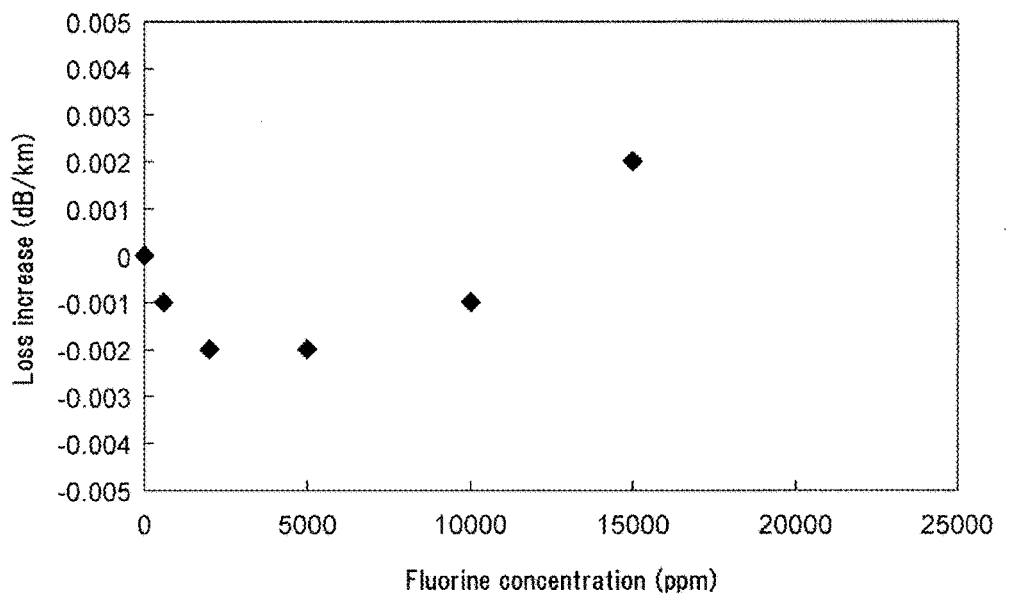
FIG. 3 is a graph showing the relationship between the average fluorine concentration of the second core and the amount of increase/decrease of the attenuation at the wavelength of 1550 nm with respect to the optical fiber of FIG. 1.

FIG. 3 is a graph showing the relationship between the average fluorine concentration of the second core 12 and the amount of increase/decrease of the attenuation at the wavelength of 1550 nm. Table II is a summary of relationship between the average fluorine concentration of the second core 12 and the amount of increase/decrease of the attenuation at the wavelength of 1550 nm. The average chlorine concentration of the second core 12 was 11000 ppm. The amount of increase/decrease of the attenuation of the optical fiber 1 was based on the attenuation in the case where the average fluorine concentration of the second core 12 of the optical fiber 1 was zero atomic ppm.

TABLE II

| Concentration of fluorine in second core [ppm] | Loss increase at 1550 nm [dB/km] |
| --- | --- |
| 0 | 0.000 |
| 500 | −0.001 |
| 2000 | −0.002 |
| 5000 | −0.002 |
| 10000 | −0.001 |
| 15000 | 0.002 |
| 20000 | 0.008 |

As shown in FIG. 3 and Table II, when the average fluorine concentration of the second core 12 is 500 ppm or more and 10000 ppm or less, the attenuation of the optical fiber 1 at the wavelength of 1550 nm decreases by 0.001 dB/km as compared to the standard. Also, when the average fluorine concentration of the second core 12 is 2000 ppm or more and 5000 ppm or less, the attenuation of the optical fiber 1 at the wavelength of 1550 nm decreases by 0.002 dB/km as compared to the standard. In the case where the fluorine concentration of the second core 12 was increased, the attenuation due to glass distortion was lessened as a result of decrease in the viscosity of the glass. On the other hand, in the case where the fluorine concentration of the second core 12 was 5000 ppm or more, the attenuation due to the refractive-index fluctuation increased because of doping of fluorine.

When the fluorine concentration of the second core 12 was 10000 ppm or more, which was beyond the effective range of the attenuation reduction due to decrease in viscosity, the attenuation was generally worsened.

Figure 4:
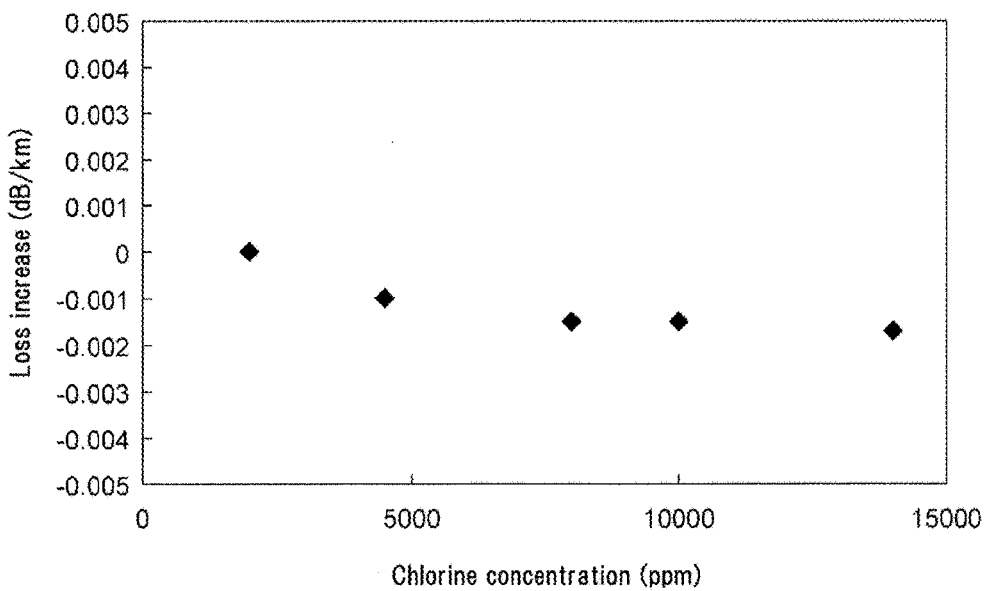
FIG. 4 is a graph showing the relationship between the average chlorine concentration of the second core and the amount of increase/decrease of the attenuation at the wavelength of 1550 nm with respect to the optical fiber of FIG. 1.

FIG. 4 is a graph showing the relationship between the average chlorine concentration of the second core 12 and the amount of increase/decrease of the attenuation at the wavelength of 1550 nm. Table III is a graph showing the relationship between the average chlorine concentration of the second core 12 and the amount of increase/decrease of the attenuation at the wavelength of 1550 nm. The average fluorine concentration of the core 10 of the optical fiber 1 was set to 2000 atomic ppm. The amount of increase/decrease in the attenuation of the optical fiber 1 was based on the attenuation in the case where the average chlorine concentration of the second core 12 of the optical fiber 1 was 2000 atomic ppm.

TABLE III

| Concentration of chlorine in second core [ppm] | Loss increase at 1550 nm [dB/km] |
|---|---|
| 2000 | 0.000 |
| 4500 | −0.001 |
| 8000 | −0.0015 |
| 10000 | −0.0015 |
| 14000 | −0.0017 |

As can be seen from FIG. 4 and Table III, the attenuation of the optical fiber 1 at the wavelength of 1550 nm decreased by 0.001 to 0.015 dB/km as compared to the standard when the average chlorine concentration of the second core 12 of the optical fiber 1 was 4500 atomic ppm or more and 15000 atomic ppm or less. This is because the glass viscosity was reduced by adding chlorine to the second core 12 and the attenuation due to glass distortion decreased. When the chlorine concentration of the second core 12 is increased, the attenuation available at the time when chlorine of 15000 ppm is added is lower than the attenuation available in the case where no chlorine is added. It is surmised that when chlorine is added to the second core 12 at higher concentration, a lower loss would be acquirable. However, from the viewpoint of glass manufacturing process, adding at a higher concentration would be difficult.

In order to make the optical fiber 1 having a ring-like refractive-index profile, it is desirable that the first core 11 contain fluorine. However, as mentioned above, it is known that when the first core 11 contains much fluorine, the attenuation becomes worse because of refractive-index fluctuation caused by addition of fluorine. Thus, the fluorine concentration of the first core 11 is preferably 5000 ppm or more and 15000 ppm or less. In order to make the relative refractive index difference of the first core 11 lower than −0.05% relative to the second core 12, it is necessary to add fluorine to the first core 11 at a concentration higher than 5000 ppm.

Figure 5:
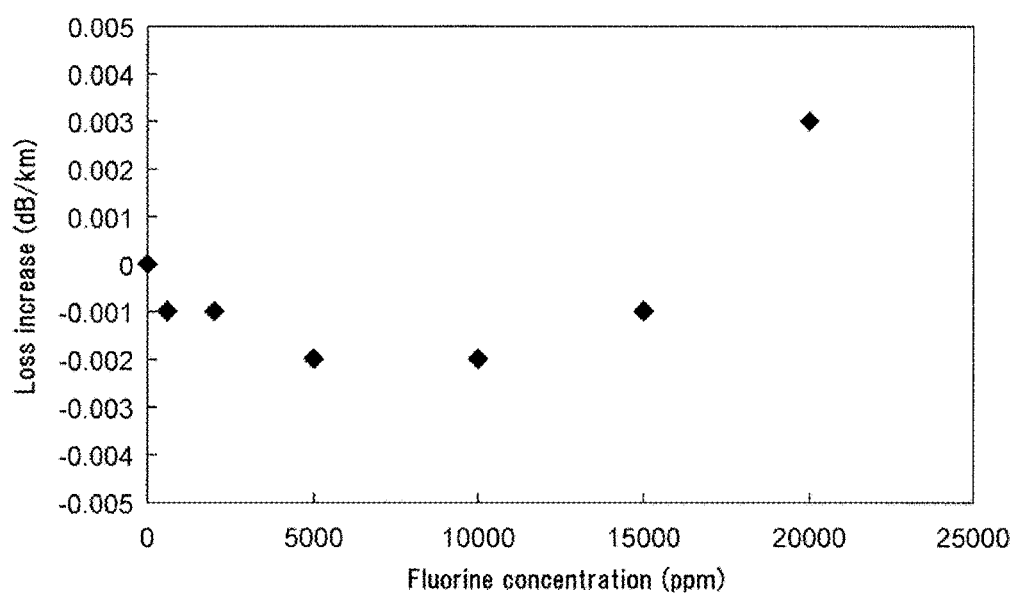
FIG. 5 is a graph showing the relationship between the fluorine concentration of the first core and the amount of increase/decrease of the attenuation at the wavelength of 1550 nm with respect to the optical fiber of FIG. 1.

FIG. 5 is a graph showing the relationship between the fluorine concentration of the first core 11 and the amount of increase/decrease of the attenuation at the wavelength of 1550 nm. Table W is a summary of the relationship between the fluorine concentration of the first core 11 and the amount of increase/decrease of the attenuation at the wavelength of 1550 nm. As can be seen from FIG. 5 and Table IV, the increase of attenuation due to concentration fluctuation in the first core 11, in which the integration of optical power is small, tends to occur less than in the second core 12, and the highest fluorine concentration of the first core 11 can be made as high as 15000 ppm.

TABLE IV

| Concentration of fluorine in first core [ppm] | Loss increase at 1550 nm [dB/km] |
|---|---|
| 0 | 0.0 |
| 600 | −0.001 |

TABLE IV-continued

| Concentration of fluorine in first core [ppm] | Loss increase at 1550 nm [dB/km] |
|---|---|
| 2000 | −0.001 |
| 5000 | −0.002 |
| 10000 | −0.002 |
| 15000 | −0.001 |
| 20000 | 0.008 |

In the second core 12, the chlorine concentration is preferably higher than fluorine concentration. It is known that the variation of a refractive index due to chlorine concentration is smaller than that due to fluorine concentration. On the other hand, as to the amount of reduction in viscosity relative to concentration, fluorine and chlorine are equivalent to each other, and therefore chlorine is suitable as a dopant for reducing viscosity while suppressing the attenuation due to refractive-index fluctuation. Thus, it is expectable that the attenuation be smaller if the halogen concentration for reducing viscosity of glass is attained by making chlorine concentration higher than fluorine concentration in the second core 12.

The chlorine concentration of the first core 11 is preferably 10 ppm or more and 1000 ppm or less. The chlorine is a dopant for increasing refractive index, and therefore to form a ring-like refractive-index profile, it is preferable to set the concentration of chlorine to a low level. In such case, when the chlorine concentration of the first core 11 is 1000 ppm or less, the influence of chlorine on the refractive index will be 0.01% or less, which is ignorable. On the other hand, when chlorine concentration of the first core 11 was set to 0, a conspicuous increase of the attenuation due to glass imperfection occurred, and hence it was necessary to add chlorine of 10 ppm or more.

It is preferable that both or either one of alkali metal element and alkaline earth metal element be contained at least in a part of the core region of the optical fiber preform for making the optical fiber 1 of the present embodiment by drawing. Preferably, the alkali metal elements include any of sodium (Na), potassium (K), rubidium (Rb), cesium (Cs), magnesium (Mg), calcium (Ca), and strontium (Sr). In such case, the viscosity of the core region of the optical fiber preform can be reduced further, and the attenuation of the optical fiber 1 can further be reduced. It is preferable that the core region of the optical fiber preform be composed of a first core region including a central axis and a second core region enclosing the first core region, and of such first and second core regions, the first core region contain an alkali metal element or an alkaline earth metal element.

Figure 7:
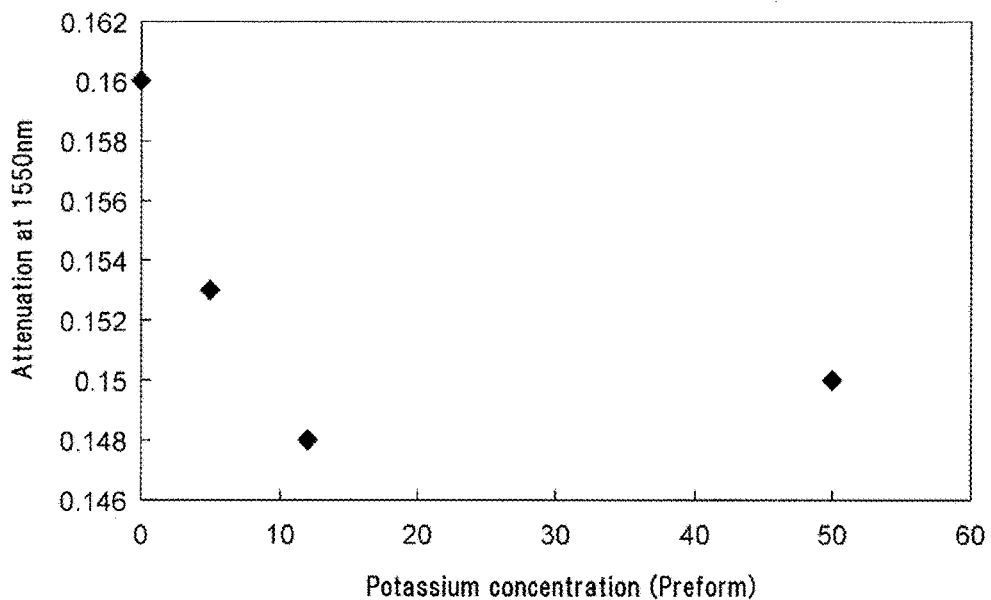
FIG. 7 is a graph showing the relationship between the average potassium concentration of the core region of an optical fiber preform and the attenuation of the resultant optical fiber at the wavelength of 1550 nm.

FIG. 6 is a table summarizing an average potassium concentration of the core region of an optical fiber preform, the average fluorine concentration and average chlorine concentration of the first core 11 of the optical fiber 1, the average fluorine concentration and average chlorine concentration of the second core 12 of the optical fiber 1, and the attenuation of the optical fiber 1 at the wavelength of 1550 nm. The average potassium concentration of the core region of an optical fiber preform means the concentration obtained in a manner in which the concentration of potassium added to the first core region is averaged in terms of both the first core region and the second core region. In the fiber manufacturing process, alkali metals spread in the whole core by thermal diffusion, and therefore, the concentration available after such spreading, rather than the concentration available at the initial stage, showed high correlation with the attenuation. The first core 11 and the second core 12 of the optical fiber 1 correspond to the first core region and the second core region of the optical fiber preform. Preferably, the cladding 20 of the optical fiber 1 contains fluorine at the average concentration of 20000 atomic ppm or more. FIG. 7 is a graph showing the relationship between the average potassium concentration of the core region of an optical fiber preform and the attenuation of the optical fiber at the wavelength of 1550 nm.

If an alkali metal is added to a glass in which the average chlorine concentration is higher than 500 atomic ppm, crystallization tends to occur easily in the glass, and consequently the production yield of an optical fiber will decrease. Therefore, preferably, the first core region to which alkali metal is to be added includes chlorine at a low concentration of 200 atomic ppm or less in order to suppress crystallization in the optical fiber preform, and the second core region includes chlorine at high concentration in order to restrain occurrence of glass imperfection during the drawing process.

Figure 8:
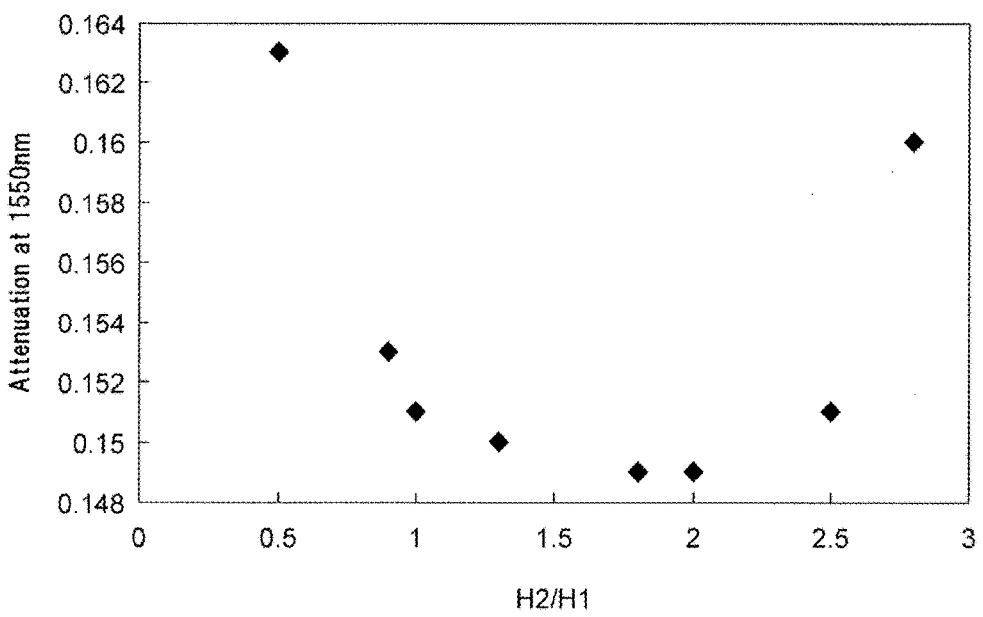
FIG. 8 is a graph showing the relationship between the attenuation at the wavelength of 1550 nm and the ratio H2/H1 in which H2 represents a halogen concentration of the second core and H1 represents a halogen concentration of the first core with respect to the optical fiber of FIG. 1.

When potassium is added only to the first core region in an optical fiber preform, the second core region will have a higher viscosity as compared to the first core region. Therefore, it is preferable for the second core region to have higher halogen concentration than the first core region. FIG. 8 is a graph showing the relationship between the attenuation at the wavelength of 1550 nm and the ratio H2/H1 in which H2 represents the halogen concentration of the second core 12 and H1 represents the halogen concentration H1 of the first core 11. Table V is a summary of the relationship between the attenuation at the wavelength of 1550 nm and the ratio H2/H1. The average potassium concentration in the core region of an optical fiber preform was 12 ppm.

TABLE V

| H2/H1 | Loss at 1550 nm [dB/km] |
|---|---|
| 0.5 | 0.163 |
| 0.9 | 0.153 |
| 1.0 | 0.151 |
| 1.3 | 0.150 |
| 1.8 | 0.149 |
| 2.0 | 0.149 |
| 2.5 | 0.151 |
| 2.8 | 0.160 |

As can be seen from FIG. 8 and Table V, preferably H2/H1 is 1 or more and 2 or less. When H2/H1 is smaller than 1, a distortion occurs between the first core and the second core because the second core becomes harder as compared with the first core, and consequently the attenuation is worsened. On the other hand, when H2/H1 is larger than 2, conversely the first core becomes harder than the second core and the attenuation caused by distortion conspicuously increases.

Regarding the core region of the optical fiber preform, it was confirmed that the viscosity further decreased according to increase of the average potassium concentration, so that the fictive temperature at the time of drawing process was lowered, resulting in lessened attenuation of the resultant optical fiber. On the other hand, if the average potassium concentration exceeds 50 atomic ppm, crystallization will occur in the core region of the optical fiber preform. Therefore, the average potassium concentration of the core region of an optical fiber preform is preferably 5 to 50 atomic ppm. Moreover, the ratio of the core region to the first core region is preferably from 5 to 7.

What is claimed is:

1. An optical fiber comprising:
   a silica glass core containing substantially no germanium and including a first core and a second core, the second core enclosing the first core, the refractive index of the second core being larger than the refractive index of the first core, and the average value of halogen concentration of the second core being 5000 ppm or more; and
   a silica glass cladding surrounding the second core and containing substantially no germanium, the refractive index of the cladding being smaller than the refractive index of the first core.

2. An optical fiber as set forth in claim 1, wherein the relative refractive index difference of the second core is −0.05% or more and +0.05% or less on the basis of the refractive index of pure silica glass.

3. An optical fiber as set forth in claim 1, wherein the fluorine concentration of the second core is 500 ppm or more and 10000 ppm or less.

4. An optical fiber as set forth in claim 1, wherein the chlorine concentration of the second core is 4500 ppm or more and 15000 ppm or less.

5. An optical fiber as set forth in claim 1, wherein the chlorine concentration is higher than the fluorine concentration in the second core.

6. An optical fiber as set forth in claim 1, wherein the fluorine concentration of the first core is 5000 ppm or more and 15000 ppm or less.

7. An optical fiber as set forth in claim 1, wherein the chlorine concentration of the first core is 10 ppm or more and 1000 ppm or less.

8. An optical fiber as set forth in claim 1, wherein the relative refractive index difference between the first core and the second core is 0.05% or more and 0.15% or less.

9. An optical fiber as set forth in claim 1, wherein the ratio H2/H1 is 1 or more and 2 or less, H2 being the halogen concentration of the second and H1 being the halogen concentration of the first core.

10. An optical fiber as set forth in claim 1, wherein the core contains both or either one of alkali metal and alkaline earth metal.

* * * * *